C. Whitsett,
Turning Bungs
No. 1,337.    Patented Sep. 25, 1839.

UNITED STATES PATENT OFFICE.

CHARLES WHITSITT, OF CONNERSVILLE, INDIANA.

ROTARY SAW FOR CUTTING ROUND TENONS, &c.

Specification of Letters Patent No. 1,337, dated September 25, 1839.

*To all whom it may concern:*

Be it known that I, CHARLES WHITSITT, of Connersville, in the county of Fayette and State of Indiana, have invented a new and useful Machine for Constructing Round Tenons or Pins, called the "Rotary Saw."

This saw is used for making round tenons, on small timbers, in carpenters' and cabinet work, which (pins) enter a corresponding hole, made by a common center bit, in the same way that a square tenon enters a corresponding mortise; and I do hereby declare that the following is a full and exact description.

Figure 1:
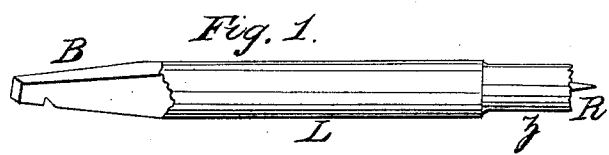

The "rotary saw," is constructed, 1st, of a shaft of wood or metal; see Figure 1 of the accompanying drawings, B L, and proportioned to the size of the saw in thickness, and as long as a common auger or center-bit; one end B, is made square so as to be put into a brace or handle, to be turned. 2d. The saw is constructed of a steel tube, Z R, about one and a half inches long, $\frac{3}{4}$ or $\frac{7}{8}$ of an inch in diameter; the plate of which this tube is composed is about as thick as a common saw plate; the teeth of said saw are cut on the outer end of the tube R.

R represents the center pin, on which the saw revolves.

Figure 2:
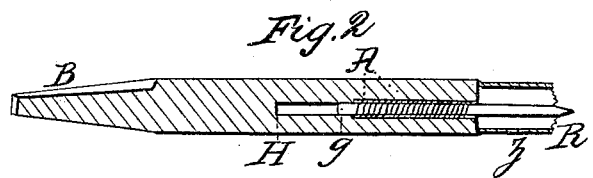

The shaft B A, Fig. 2, of the accompanying drawing, is hollow up to H, in which the center-pin R $g$ is placed. Around this center-pin, the spiral spring A is wrapped, and acts in such a way that the center-pin is thrust out past the teeth, on the saw. In the operation of making tenons with this machine, the center pin recedes as the saw advances.

What I claim as my invention, and desire to secure by Letters Patent, is—

The combination of the rotary saw, with the center pin, pressed out by a spring as herein described.

CHARLES WHITSITT.

Witnesses:
   ELISHA VANCE,
   JOHN WILLEY.